(12) United States Patent
Nemati et al.

(10) Patent No.: US 8,739,023 B2
(45) Date of Patent: May 27, 2014

(54) UTILIZING A GRAPHICAL TRANSITION TO SORT AN INTERFACE ELEMENT INDEPENDENTLY OF A DOCUMENT OBJECT MODEL

(75) Inventors: Marc A. Nemati, Carrolton, TX (US); James Paul Appleyard, North Richland Hills, TX (US)

(73) Assignee: International Business Machines Corporation, Armonk, NY (US)

( * ) Notice: Subject to any disclaimer, the term of this patent is extended or adjusted under 35 U.S.C. 154(b) by 137 days.

(21) Appl. No.: 13/186,575

(22) Filed: Jul. 20, 2011

(65) Prior Publication Data
US 2013/0024763 A1    Jan. 24, 2013

(51) Int. Cl.
*G06F 17/21* (2006.01)

(52) U.S. Cl.
USPC .......................................................... 715/234

(58) Field of Classification Search
USPC .......................................................... 715/234
See application file for complete search history.

(56) References Cited

U.S. PATENT DOCUMENTS

| | | | |
|---|---|---|---|
| 5,491,778 A | 2/1996 | Gordon et al. | |
| 5,949,421 A | 9/1999 | Ogletree et al. | |
| 7,233,951 B1* | 6/2007 | Gainer et al. | 1/1 |
| 7,620,633 B1* | 11/2009 | Parsons et al. | 1/1 |
| 8,212,821 B1* | 7/2012 | Kopylov et al. | 345/473 |
| 2005/0022116 A1* | 1/2005 | Bowman et al. | 715/513 |
| 2006/0015805 A1* | 1/2006 | Humenansky et al. | 715/503 |
| 2006/0041834 A1* | 2/2006 | Chen et al. | 715/509 |
| 2007/0233811 A1* | 10/2007 | Rochelle et al. | 709/219 |
| 2007/0260585 A1* | 11/2007 | Bodine et al. | 707/3 |
| 2008/0201118 A1* | 8/2008 | Luo | 703/2 |
| 2008/0303828 A1* | 12/2008 | Marchant et al. | 345/473 |
| 2009/0228784 A1* | 9/2009 | Drieu et al. | 715/235 |
| 2010/0083172 A1* | 4/2010 | Breeds et al. | 715/810 |
| 2011/0270777 A1* | 11/2011 | Weiser | 705/347 |

OTHER PUBLICATIONS

Croxall, Animated Table Sort (REGEXP Friendly), as published at http://www.mitya.co.uk/scripts/Animated-table-sort-REGEXP-friendly-111 on Aug. 21, 2010 and corresponding source code to jquery.tableSort.js as published at http://mitya.co.uk/scripts/111/source/jquery.tableSort.js on Nov. 4, 2010, p. 1-21.*
Goodman, Javascript & DHTML Cookbook, O'Reilly Media Inc., 2nd Edition, Aug. 8, 2007, p. 392-451.*

* cited by examiner

*Primary Examiner* — Frank D Mills
(74) *Attorney, Agent, or Firm* — Patents on Demand P.A.; Brian K. Buchheit; Scott M. Garrett

(57) ABSTRACT

One or more elements can be rendered within a canvas of an interface. The elements can be associated with an element attribute and an element data. The elements can be user interface elements. The elements can be associated with a document object model of a markup language document. The interface can be a Web browser. The elements can be visually sorted differently via a graphical transition effect. The transition effect can execute to sort the elements without modifying objects of the document object model, without changing the elements as specified in a mark document being rendered, and without changing the element data of the elements being sorted.

19 Claims, 3 Drawing Sheets

UTILIZING A GRAPHICAL TRANSITION TO SORT AN INTERFACE ELEMENT INDEPENDENTLY OF A DOCUMENT OBJECT MODEL

BACKGROUND

The present invention relates to the field of graphical effects and replacement or sorting of visual information and, more particularly, to utilizing a graphical transition to sort an interface element independently of a document object model.

Traditionally, sorting of user interface (e.g., text fields, labels) elements of a Web document (e.g., Web page) requires manipulating the document object model (DOM) associated with the document. For example, JavaScript is often utilized to dynamically alter text field positioning of a Web page by modifying the document object model of the Web page. This process typically triggers deconstruction/reconstruction of elements and/or data transfer between elements. For example, when moving an interface element within a DOM, the element can be copied into memory, repositioned within the DOM, and deleted from the original position. Consequently, memory and processor usage can be significantly increased during this process. The problem is further compounded when several subsequent renderings (e.g., multiple sorts) on elements are performed.

BRIEF SUMMARY

One aspect of the present invention can include an apparatus, a system, a computer program product, and method for utilizing a graphical transition to sort an interface element independently of a document object model. One or more elements can be rendered within a canvas of an interface. The elements can be associated with an element attribute and an element data. The elements can be user interface elements. The elements can be associated with a document object model of a markup language document. The interface can be a Web browser. The elements can be visually sorted differently via a graphical transition effect. The transition effect cannot modify the document object model, the elements, or the element data.

Another aspect of the present invention can include an apparatus, a computer program product, a system, and a method for utilizing a graphical transition to sort an interface element independently of a document object model. A transition effect associated with a markup language document can be identified. The transition effect can include a non-native transition property. The non-native transition property can be translated into a native transition property. The native transition property can be associated with a Web browser revision and/or a rendering engine. The transition effect can be run within the Web browser. The transition effect can visually change the layout of one or more user interface elements and cannot manipulate the document object model of the markup language document.

Yet another aspect of the present invention can include an apparatus, a computer program product, a method, and a system for utilizing a graphical transition to sort an interface element independently of a document object model. A rendering engine can be able to execute a transition effect upon a markup language document. The markup language document can include one or more user interface elements. The markup language document can be associated with a document object model. The transition effect can visually modify the user interface elements and the document object model can be unaffected. The present invention can include a data store able to persist a data set associated with the transition effect. The transition effect can be associated with a duration value and a delay value.

DETAILED DESCRIPTION

Figure 1:
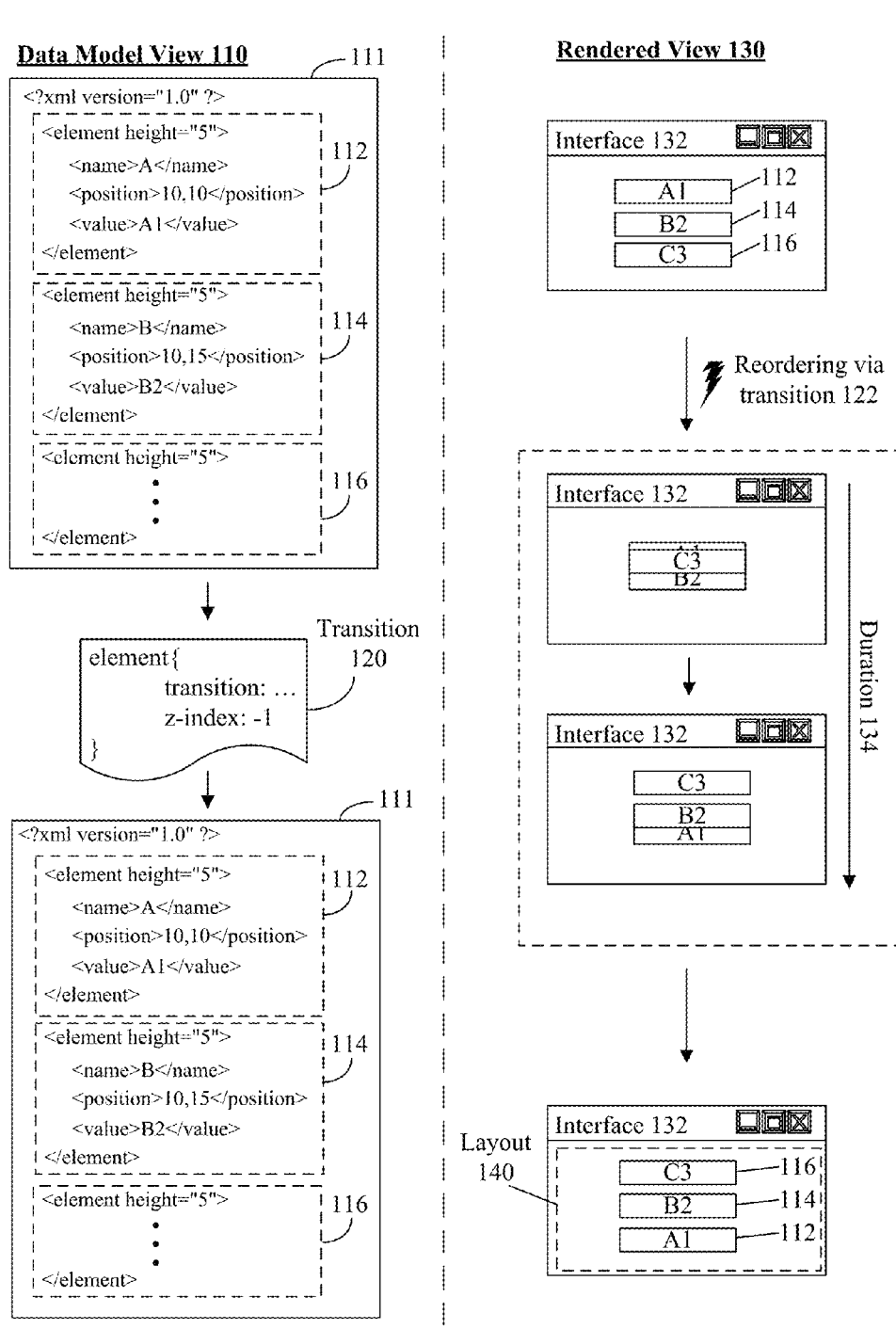
FIG. 1 is a schematic diagram illustrating a flow for utilizing a graphical transition to sort an interface element independently of a document object model in accordance with an embodiment of the inventive arrangements disclosed herein.

The present disclosure is a solution for utilizing a graphical transition to manipulate an interface element independent of a document object model. In the solution, a graphical transition effect can be performed to alter the visual presentation of interface elements of a markup language document (e.g., Web page). The visual presentation can include, element ordering, element position, and the like. For example, a traditional element sort functionality can be "short circuited" by visually sorting elements without manipulating the document object model (DOM) structure. In one embodiment, a Cascading Style Sheet transition effect can be utilized to dynamically alter the visual presentation of interface elements in a Web page. In the embodiment, an element (e.g., <div>) can be repositioned using an offset value (e.g., margin-left: −35px) from a home position of the element via the transition effect properties.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction processing system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction processing system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a schematic diagram illustrating a flow 100 for utilizing a graphical transition to sort an interface element independently of a document object model in accordance with an embodiment of the inventive arrangements disclosed herein. Flow 100 can be present in the context of system 200 and method 300. In flow 100, a markup language document 111 (e.g., Web page) can be represented in a data model view 110 and a rendered view 130. Data model view 110 can be associated with a document object model (DOM), a data hierarchy, and the like. For example, data model view 110 can be a source code view of a Hypertext Markup Language (HTML) document. Rendered view 130 can be a visually presented layout of document 111 within an interface 132 (e.g., Web browser). View 130 can present user interface elements 112-116 (e.g., text fields) which can have corresponding data model representations within the data model view 110. That is, extensible markup language (XML) code 112 within data model view 110 can be rendered as element 112 within rendered view 130. For example, element A with corresponding value A1 of view 110 can be visualized as element 112 within rendered view 130.

It should be appreciated that the disclosure is distinct from traditional solutions which manipulate the underlying data organization to present a different view of interface elements. The disclosure can utilize a graphical transition effect to visually change interface elements within a rendered view 130 leaving data within data model view 110 unaffected. That is, the disclosure leverages the separation of content and presentation principles of markup languages to efficiently reorganize interface elements without affecting the document object model of a document. For example, data model view 110 shows the application of transition 120 results in document 111 remaining unchanged (e.g., element order is unchanged).

In flow 100, a transition 120 can be utilized to visually reorganize (e.g., sort) the layout of interface elements 112-116 within interface 132 based on a sort ordering. For example, transition 120 can change the z-ordering of elements 112-116 via a z-index property presenting elements 112-116 from a row to a three dimensional stack (e.g., layout 140). The transition 120 can be a DOM independent graphical effect manipulating the visualization of interface elements over a duration of time. Transition 120 can be associated with one or more transition effects of a Cascading Style Sheet (CSS) transition (e.g., CSS3), Dynamic Hypertext Markup Language (DHTML) transition, and the like. Transition 120 can be associated with one or more properties including, but not limited to, duration, delay, height, length, margin, padding, and the like. Transition 120 can be triggered from an event including, but not limited to, onclick, hover, focus, and the like.

Transition 120 can be customizably modified to arbitrarily affect layout of elements 112-116. In rendered view 130, the application of a transition 120 can occur as reordering via transition 122 action. The action can be triggered automatically and/or manually based on transition 120 configuration. Over duration 134, elements 112-116 can be manipulated within interface 132 via transition 120. Duration 134 can conform to a timing value including a static value, a dynamic value, and the like. For example, duration 134 can be a cubic-bezier timing function. In one embodiment, duration 134 can be set to minimize intermediate positions of elements 112-116, so that the no visual motion is shown upon a display. In other words, a transition 120 can be established that effectively causes a visual re-sorting or re-positioning (e.g., visual movement of elements 112-116 within a display) to occur without visual effects of the transitions being seen by an end-user.

In one embodiment, transition 120 can be an implicit transition able to modify CSS properties over a duration of time. In the embodiment, transition 120 can include multiple properties associated with a CSS language. For example, transition 120 can move elements 112-116 to the bottom of interface 132 using the bottom property.

Transition 120 can perform traditional sorting functionality (e.g., alphabetical sort) on interface elements and/or element values. That is, transition 120 can dynamically present a sorting of interface elements without requiring DOM manipulation. For example, transition 120 can present interface elements 112-116 sorted by descending order of the element name. In one embodiment, element 112-116 values can be evaluated and a sort order can be determined. In the embodiment, sort order can be visually represented and presented within an interface. That is, the disclosure can reduce memory and processor consumption typically associated with interface element sorting of a markup language document.

As used herein, a markup language document can be associated with a Uniform Resource Identifier. Markup associated with markup language document can include, but is not limited to, presentational markup, procedural markup, descriptive markup, and the like. Markup language document can include, but is not limited to, HTML, Extensible HTML (XHTML), Extensible Markup Language (XML), Standard Generalized Markup Language (SGML), and the like.

Drawings presented herein are for illustrative purposes only and should not be construed to limit the invention in any regard. The disclosure can permit a "sort preview" functionality which can be quickly modified with minimal computing resource usage. That is, multiple applications of transitions can allow customized views of interface elements 112-116 without necessitating mutable access to the DOM. It should be appreciated that transition 120 can be temporary and layout 140 can be reset utilizing traditional interface interactions. For example, a browser page reload action can cause layout 140 to be reset to an original rendering layout conforming to the DOM.

Figure 2:
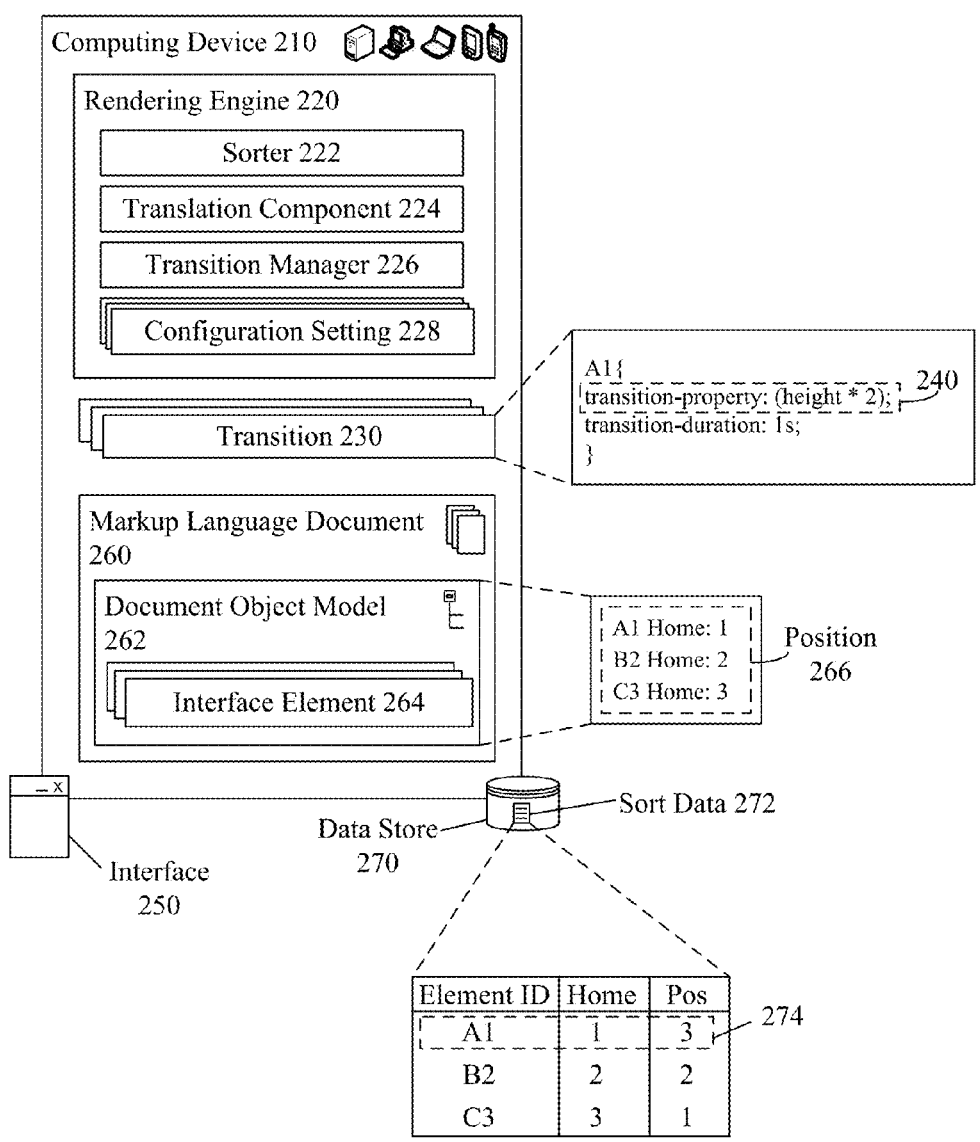
FIG. 2 is a schematic diagram illustrating a system for utilizing a graphical transition to sort an interface element independently of a document object model in accordance with an embodiment of the inventive arrangements disclosed herein.

FIG. 2 is a schematic diagram illustrating a system 200 for utilizing a graphical transition to manipulate an interface element independently of a document object model in accordance with an embodiment of the inventive arrangements disclosed herein. System 200 can be present in the context of flow 100 and method 300. In system 200, a transition 230 can be processed by a rendering engine 220 to affect a markup language document 260 presentation based on a sort order. Sort order can be determined automatically and/or manually. For example, a transition 230 can be utilized as a preset which can sort interface elements by element width. It should be appreciated that sorting element 264 visually cannot affect document object model (DOM) 262.

Rendering engine 220 can be a hardware/software component for presenting markup language document 260 within an interface 250. Engine 220 functionality can include, but is not limited to, document object model processing, logic processing, layout rendering, formatting, and the like. Engine 220 can conform to a Hypertext Markup Language (HTML), Extensible HTML (XHTML), Extensible Markup Language (XML), and the like. Engine 220 can be a component of a Web browser, electronic mail client, visualization application, and the like. That is, engine 220 can be a localized rendering component able to visually sort elements within a markup language document. Engine 220 can conform to traditional and/or proprietary rendering engines including, but not limited to, APPLE SAFARI WEBKIT, GECKO, and the like.

Sorter 222 can be a hardware/software entity able to arrange an interface element 264 based on a ordering and/or a category. Sorter 222 functionality can include, but is not limited to, sort order selection, sort category selection, algorithm selection, element position determination, and the like. Sorter 222 can perform traditional and non-traditional sorting including, but not limited to, alphabetical sort, alphanumeric sort, numeric sort, shuffling, and the like. Sorter 222 functionality can be arbitrarily complex permitting extensible sort capabilities. In one instance, sorter 222 can sort elements by name, distance, metrics, and the like.

Translation component 224 can be a hardware/software element able to compute visual positioning information for interface elements based on sort data 272. Component 224 can utilize data obtained from document object model 262 (e.g., element height, element width) and sort data 272 to compute a layout positioning for element 264. For example, entry 274 can indicate the reordering for an element A1 which can be used to generate a visual position. Component 224 can be used to compute a position for the element based on the sort which can be a relative offset. For example, in transition property 240, element A1 can be repositioned at an offset of twice the height of the element.

Transition manager 226 can be a hardware/software entity able to evaluate and/or perform transition 230. Manager 226 functionality can include, transition property evaluation, syntax evaluation, transition management, transition processing, and the like. Manager 226 can be utilized to store transition 230 for application upon any document 260. That is, a library of previously established transitions can be maintained to perform sorting functions. For example, manager 226 can permit selection of multiple sorts such as element value based sort and a metric based sort.

Transition 230 can be a graphical effect associated with document 260. Transition 230 can include, but is not limited to, a stylesheet, an algorithmic function, and the like. In one instance, transition 230 can be an embedded style sheet within document 260. In another instance, transition 230 can be an external style sheet programmatically linked to document 260. Transition 230 can include multiple transition properties conforming to a World Wide Web Consortium (W3C) transition. Properties can include static values, dynamic values, and the like. For instance, transition 230 can include DOM derived values including, but not limited to, height, width, position, margin, and the like. Transition 230 can be associated with an element, an element container, an event, and the like. For example, transition 230 can be run when a cursor hovers over a selected element.

The transition 230 can be triggered based on any definable event, such as an event associated with a selection of a sort option. For example, a sort button can appear on a screen, and a transition 230 that effectuates the sort can fire whenever the sort button is selected. Sort criteria can also be implemented, when implementing the transition that results in a visual sorting of elements.

Markup language document 260 can be an annotated digital artifact which can be syntactically distinguishable from text. Document 260 can include, but is not limited to, an HTML file, an XML file, and the like. In one instance, document 260 can be associated with transition 230. For example, document 260 can be a Web page constructed from HTML markup and Cascading Style Sheet (CSS) data. Document 260 can be stored within device 210, data store 270, a communicatively linked data store, and the like.

Document object model 262 can be a cross-platform and language-independent model for representing and interacting with markup language objects (e.g., interface element 264). Model 262 can conform to World Wide Web Consortium (W3C) DOM specifications. Model 262 can include position 266 information which can be utilized to visually reorganize element 264. Position 266 can be implicitly and/or explicitly defined within the DOM. For example, position of an element A1 can be determined by analyzing the location within the DOM structure (e.g., first element in the DOM).

Interface element 264 can be a markup language object which can be presented within interface 250. Element 264 can include, but is not limited to, text fields, text areas, checkboxes, radio dialogs, interface buttons, labels, and the like. It should be appreciated that interface element 264 can include non-renderable elements including, but not limited to, hidden fields, non-renderable tags, and the like. Element 264 can include a data value, an attribute, a property and the like. For example, element 264 can be a text field with a corresponding value of A1. In one instance, interaction with element 264 can trigger transition 230 to be processed.

Interface 250 can be a user interactive component permitting interaction with a markup language document 260 and/or a transition 230. Interface 250 can be present within the context of a Web browser application, an electronic mail application, a file manager application, and the like. Interface 250 capabilities can include a graphical user interface (GUI), voice user interface (VUI), mixed-mode interface, touch sensitive interface, and the like. Interface 250 can be communicatively linked to computing device 210.

Sort data 272 can be one or more data sets for determining a sort order for elements within 262. Sort data 272 can include, but is not limited to, element identifier, home positioning information, sort order information, and the like. Sort data 272 can be utilized to visually reorganize elements within interface 250. Sort data 272 can be stored within data store 270, computing device 210, engine 220, and the like.

Data store 270 can be a hardware/software component able to store sort data 272. Data store 270 can be a Storage Area Network (SAN), Network Attached Storage (NAS), and the like. Data store 270 can conform to a relational database management system (RDBMS), object oriented database management system (OODBMS), and the like. Data store 270 can be communicatively linked to computing device 210 in one or more traditional and/or proprietary mechanisms.

Drawings presented herein are for illustrative purposes only and should not be construed to limit the invention in any regard. Configuration setting 228 can be one or more options for configuring system 200 behavior. Setting 228 can include, but is not limited to, sorter 222 settings, translation component 224 options, transition manager 226 parameters, and the like. System 200 functionality can be embodied within an application programming interface (API), plug-in, and the like. It should be appreciated that sort data 272 can be temporarily persisted for the duration of the transition 230.

It should be understood that one or more components of system 200 can be optionally omitted providing system 200 functionality is maintained.

Figure 3:
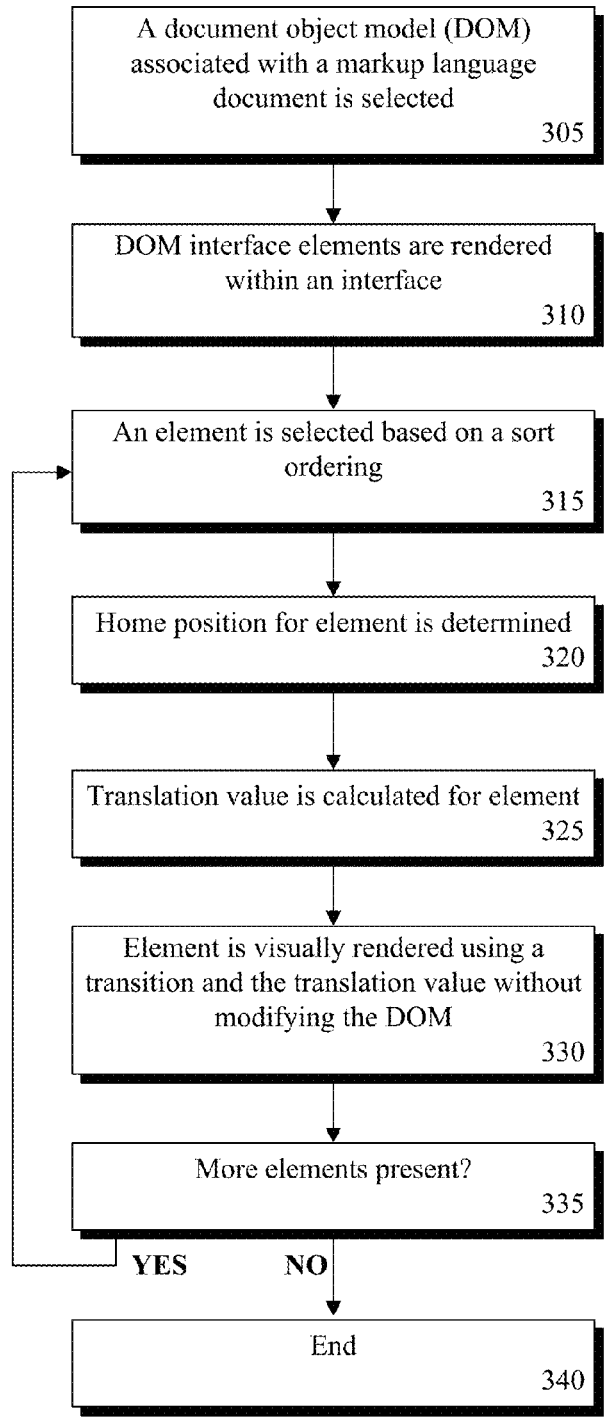
FIG. 3 is a schematic diagram illustrating a method for utilizing a graphical transition to sort an interface element independently of a document object model in accordance with an embodiment of the inventive arrangements disclosed herein.

FIG. 3 is a schematic diagram illustrating a method 300 for utilizing a graphical transition to manipulate an interface element independently of a document object model in accordance with an embodiment of the inventive arrangements disclosed herein. Method 300 can be performed in the context of flow 100 and system 200. In method 300, a set of interface elements can be visually sorted without affecting the DOM of a markup language document. Method 300 can be performed in serial and/or in parallel.

In step 305, a document object model (DOM) associated with a markup language document can be selected. In step 310, DOM interface elements can be rendered within an interface. In step 315, an element can be selected based on a sort ordering. Selection can be based on DOM element ordering, element values, an element container, and the like. For example, a portion of a markup language document (e.g., a subset of elements) can be visually sorted and presented. Sort ordering can be automatically and/or manually determined. For example, a user can select a sort ordering (e.g., alphabetical) from a pop-up dialog. In step 320, the home position of an element can be determined. The position can be determined utilizing conventional markup language processing. For example, attribute values specifying the default position of an interface element can be obtained during DOM processing and/or initial rendering (e.g., step 310).

In step 325, a transition value can be calculated for the element. The transition value can be an offset value of the home position obtained within step 320. In step 330, the element can be visually rendered using a transition effect and the translation value without modifying the DOM. The transition effect can include multiple graphical effects including, but not limited to, element hue manipulation, background changes, wipes, fades, blurs, and the like. In step 335, if there are more elements present, the method can continue to step 340, else return to step 315. Steps 315-335 can be continuously run for each element within the DOM to be visually sorted. In step 340, the method can end.

Drawings presented herein are for illustrative purposes only and should not be construed to limit the invention in any regard. It should be appreciated that the document object model can be unmodified during the method handling operations.

The flowchart and block diagrams in the FIGS. 1-3 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for visually re-ordering interface elements comprising:

a computing device identifying a plurality of elements rendered within a canvas of an interface, wherein the plurality of elements is associated with at least one of an element attribute and an element data, wherein the plurality of elements is a user interface element, wherein the plurality of elements is associated with a document object model of a markup language document, wherein the interface is a Web browser; and the computing device visually sorting the elements differently via a graphical transition effect designed so that no visual motion resulting from the transition effect is shown upon the display, wherein the transition effect causes a visual resorting or re-positioning to occur without visual effects of the transition being seen by an end-user, wherein a visual sorting of the plurality of elements occurs in a manner that does not modify the document object model, the plurality of elements as specified in the markup language document being rendered, or the element data of the elements that are visually sorted.

2. The method of claim 1, wherein use of the transition effect for visual sorting reduces memory and processor consumption that would otherwise have been consumed to sort by changing the document object model.

3. The method of claim 1, wherein the transition effect is implemented as a sort previous that has minimal computing resource usage, wherein multiple applications of transition effects for sorting allows sorting of elements in a user desired manner without necessitating mutable access to the document object model.

4. The method of claim 1, wherein the visual resorting is automatically reset to an original rendering layout conforming to the document object model by a browser page reload action.

5. The method of claim 1, wherein the visually sorting using the transition effect is performed to produce a sort result that is substantially visually equivalent to updating values of the document object model without any change occurring to the document object model in response to a user initiated sorting of the elements.

6. The method of claim 1, further comprising:
selecting a different transition effect associated with the markup language document, wherein the different transition effect is associated with a sort ordering of the plurality of elements.

7. The method of claim 1, further comprising:
determining at least one home position of the plurality of elements, wherein the home position is at least one of an absolute value and a relative value;
applying an offset value to the at least one home position, wherein the offset value is a property of the transition effect; and
visually affecting the layout of the plurality of elements within the markup language document without modifying the data of the document object model.

8. The method of claim 7, wherein the offset value is associated with at least one of a two dimensional coordinate system and a three dimensional coordinate system.

9. The method of claim 1, wherein the visually sorting is triggered by a user initiated input.

10. The method of claim 8, wherein the user initiated input is associated with at least one of a onclick event and a hover event.

11. The method of claim 1, wherein the visually sorting is triggered from a timing value associated with the transition effect.

12. The method of claim 1, wherein the plurality of elements is an HTML form element.

13. The method of claim 1, wherein the plurality of elements is a multimedia content.

14. The method of claim 10, wherein the transition effect is associated with at least one of an external style sheet and an embedded style sheet.

15. A system for visually re-ordering interface elements comprising:
one or more processors;
a non-transitory storage medium storing program instructions, wherein the one or more processors execute the program instructions;
a rendering engine, comprising a subset of the program instructions, able to execute a transition effect upon a markup language document, wherein the markup language document comprises a plurality of user interface elements, wherein markup language document is associated with a document object model, wherein the transition effect visually modifies the user interface elements and the document object model is unaffected; and
a sorter, comprising a subset of the program instructions, that visually sorts an order of elements in a data set as presented within a user interface using one or more of the transition effects while leaving values of the data sets and the corresponding document object model objects unaffected, wherein use of the transition effect by the sorter reduces memory and processor consumption that would otherwise have been consumed to sort by changing the document object model, and wherein the sorter performs a user triggered sorting function that occurs without necessitating mutable access to the document object model.

16. The system of claim 15, wherein the transition effect is associated with at least one of a Cascading Style Sheet transition and a Dynamic Hypertext Markup Language transition.

17. The system of claim 15, wherein the transition effect visually sorts the user interface elements based on a user established ordering.

18. The system of claim 15, wherein the transition effect is triggered from a delay value.

19. The system of claim 15, wherein the rendering engine is associated with a Web browser having a page reload option that triggers a browser page reload action, wherein the visual resorting of the sorter is automatically reset to an original rendering layout conforming to the document object model by the browser page reload action.

* * * * *